United States Patent [19]

Isozaki et al.

[11] Patent Number: 5,216,094
[45] Date of Patent: Jun. 1, 1993

[54] RESINS WITH UNSATURATED CARBONYL AND HYDROXYL GROUPS

[75] Inventors: Osamu Isozaki, Yokohama; Naozumi Iwasawa, Hiratsuka, both of Japan

[73] Assignee: Kansai Paint Company, Limited, Hyogo, Japan

[21] Appl. No.: 884,881

[22] Filed: May 18, 1992

Related U.S. Application Data

[63] Continuation of Ser. No. 288,069, Dec. 22, 1988, abandoned.

[30] Foreign Application Priority Data

Dec. 23, 1987 [JP] Japan .................................. 62-326023
Dec. 23, 1987 [JP] Japan .................................. 62-326024
Mar. 9, 1988 [JP] Japan .................................. 63-55598

[51] Int. Cl.$^5$ ..................... C08F 20/28; C08G 59/14; C08L 33/14; C08L 63/10
[52] U.S. Cl. ...................... 525/528; 525/13; 525/14; 525/15; 525/17; 525/20; 525/23; 525/25; 525/118; 525/127; 525/132; 525/165; 525/169; 525/183; 525/217; 525/278; 525/440; 525/450; 525/502; 528/51; 528/52; 528/56; 528/55; 528/57; 528/69; 528/73; 528/85
[58] Field of Search ............... 525/195, 196, 208, 118, 525/123, 143, 170, 183, 221, 223, 228, 423, 425, 438, 447, 454, 455, 486, 485, 480, 526, 531, 411, 412, 415, 132, 165, 169, 217, 183, 13, 14, 15, 17, 20, 23, 25, 127, 278, 440, 450, 502, 528; 528/51, 52, 56, 55, 57, 69, 73, 85

[56] References Cited

U.S. PATENT DOCUMENTS

| | | | |
|---|---|---|---|
| 4,049,634 | 9/1977 | Ko et al. | 525/208 |
| 4,242,243 | 12/1980 | Antonelli et al. | 525/208 |
| 4,529,765 | 7/1985 | DenHartog et al. | 525/208 |
| 4,577,976 | 12/1985 | Geist et al. | 525/208 |
| 4,786,682 | 11/1988 | Perez et al. | 525/28 |
| 4,845,012 | 7/1989 | Seko et al. | 522/85 |
| 4,871,822 | 10/1989 | Brindöpke et al. | 526/271 |

FOREIGN PATENT DOCUMENTS

| | | | |
|---|---|---|---|
| 44-28585 | 11/1969 | Japan | 525/195 |
| 54-135842 | 10/1979 | Japan | 525/196 |

OTHER PUBLICATIONS

Poparic et al., "Proton NMR study of the addition of diols to double bands of unsaturated polyester resins," *Chemical abstracts* No. 101:73194e, vol. 10, 1984.

Keen, "Catalytic process for production of alkoxylated esters from alcohols and unsaturated esters," *Chemical abstract* No. 109:8399b, vol. 2, 1988.

*Primary Examiner*—Robert E. Sellers
*Attorney, Agent, or Firm*—Armstrong, Westerman, Hattori, McLeland & Naughton

[57] ABSTRACT

The present invention provides a curable resin coating composition consisting essentially of:

(i) a resin (A) containing $\alpha,\beta$-unsaturated carbonyl group and primary and/or secondary hydroxyl group, or (ii) a mixture of a resin (B) containing $\alpha,\beta$-unsaturated carbonyl group and a resin (C) containing primary and/or secondary hydroxyl group, and (iii) at least one curing catalyst selected from the group consisting of alkali metal alkoxides, metal hydroxides, organic acid salts of metals, quaternary ammonium hydroxides, quaternary phosphonium hydroxides, tertiary sulfonium hydroxides and organic acid salts of these onium hydroxides.

5 Claims, No Drawings

RESINS WITH UNSATURATED CARBONYL AND HYDROXYL GROUPS

This application is a continuation of application Ser. No. 288,069 filed Dec. 22, 1988 now abandoned.

The present invention relates to novel curable resin compositions.

Curable resin compositions heretofore widely used for coating or other purposes include those which comprise a resin containing hydroxyl group as functional group and a crosslinking agent able to thermally react with the hydroxyl group, such as melamine resin, blocked isocyanate or the like. However, these compositions have the drawback of producing by-products when heat-cured such as water, alcohol or the like which would contaminate the interior of a drying furnace and would adversely affect the appearance of cured coat.

Also known are curable resin compositions comprising a resin containing $\alpha,\beta$-unsaturated carbonyl group and a polyamino compound (U.S. Pat. No. 3,975,251). When heated, this composition is crosslinked and cured by Michael addition reaction of the polyamino compound with the $\alpha,\beta$-unsaturated carbonyl group. Yet this composition is likely to entail the disadvantages that the cured coat is susceptible to discoloration and is impaired in the water resistance due to the polyamino compound remaining in the cured coat. The composition is further defective in diminishing the storage stability because of the michael addition reaction gradually proceeding during storage.

An object of the present invention is to provide a novel curable resin composition which has overcome the foregoing drawbacks.

Another object of the invention is to provide a novel curable resin composition which produces no by-product during heat-curing and which, when cured, gives coats free of discoloration and outstanding in water resistance.

A further object of the invention is to provide a novel curable resin composition which is excellent in storage stability.

These and other objects of the invention will become more apparent from the following description.

The present invention provides a curable resin composition consisting essentially of:
(i) a resin (A) containing $\alpha,\beta$-unsaturated carbonyl group and primary and/or secondary hydroxyl group, or
(ii) a mixture of a resin (B) containing $\alpha,\beta$-unsaturated carbonyl group and a resin (C) containing primary and/or secondary hydroxyl group, and
(iii) at least one curing catalyst selected from the group consisting of alkali metal alkoxides, metal hydroxides, organic acid salts of metals, quaternary ammonium hydroxides, quaternary phosphonium hydroxides, tertiary sulfonium hydroxides and organic acid salts of these onium hydroxides.

We conducted extensive research to overcome the foregoing drawbacks of known curable resin compositions and found the following.

(1) A composition comprising (I) a specific curing catalyst and a resin containing $\alpha,\beta$-unsaturated carbonyl group and primary and/or secondary hydroxyl group, or (II) the specific curing catalyst and a mixture of a resin containing the carbonyl group and a resin containing the hydroxyl group is curable on crosslinking at a relatively low temperature and is excellent in storage stability.

(2) Since the heat-curing is caused mainly by addition reaction of hydroxyl group with unsaturated group, the composition is unlikely to encounter the disadvantages attributable to the production of by-product or to provide a discolored coat when cured. Further the compositions afford coats outstanding in water resistance, surface smoothness and the like.

The present invention has been accomplished based on these novel findings.

This invention provides a curable resin composition consisting essentially of the resin (A) as the component (i) and the curing catalyst as the component (iii) and also provides a curable resin composition consisting essentially of the resin mixture as the component (ii) and the curing catalyst as the component (iii).

In the resin (A) as the component (i) containing the $\alpha,\beta$-unsaturated carbonyl group and primary and/or secondary hydroxyl group in the invention, the $\alpha,\beta$-unsaturated carbonyl group is represented by the formula

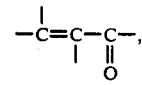

such as acryloyl, methacryloyl, itaconoyl, maleoyl, fumaroyl, crotonoyl, cinnamoyl, acrylamido, methacrylamido and the like. Of primary and secondary hydroxyl groups, a primary one is preferred in view of curability.

Insofar as the resin (A) has $\alpha,\beta$-unsaturated carbonyl group and primary and/or secondary hydroxyl group, the resin is not limited to specific type and can be any of known resins including acrylic resins, polyester resins, urethane resins, polybutadiene resins, alkyd resins, epoxy resins, phenol resins, polyether resins and polyamide resins. Further the resin (A) can be prepared by any of known processes.

The molecular weight of the resin (A) is not specifically limited. Generally the resin (A) is preferably about 250 to about 100000, more preferably about 500 to about 20000, in peak molecular weight as determined by gel permeation chromatography in view of curability and solubility in a solvent. From the viewpoints of curability and water resistance of coat, it is suitable that the resin (A) contain about 0.01 to about 20 moles, preferably about 0.1 to about 5 moles, of the $\alpha,\beta$-unsaturated carbonyl group, and about 0.01 to about 50 moles, preferably about 0.1 to about 10 moles, of the hydroxyl group, per kilogram of the resin.

Preferred examples of the resin (A) include urethane resins which have the residue of adduct of N-methylol acrylamide or methacrylamide with isocyanate, the residue being represented by the formula

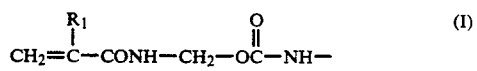

wherein $R_1$ is hydrogen atom or methyl group and which have primary and/or secondary hydroxyl group. These resins serve to give a coat excellent in adhesion because they have an amide linkage and urethane linkage. The resins also provide a coat which remains firmly adhered after immersion in boiling water because of high adhesion of the resin on one hand and the amide and urethane linkages thereof being less prone to hydrolysis than an ester linkage or the like on the other hand.

The resin containing the functional group represented by the formula (I) and the hydroxyl group can be easily prepared, for example, by reacting 1 mole of N-methylol acrylamide or methacrylamide with 1 mole of a diisocyanate compound in the absence of a catalyst or in the presence of a basic catalyst at a temperature of about 20° to about 150° C. for about 1 to about 10 hours; mixing the resulting adduct of isocyanate-containing N-methylol acrylamide or methacrylamide (hereinafter referred to as "adduct (a)") with a hydroxyl-containing resin; and reacting the isocyanate group of the adduct (a) with part of hydroxyl groups in the hydroxyl-containing resin in an inactive organic solvent in the absence of a catalyst or in the presence of a basic catalyst under the same reaction conditions as above.

Preferred examples of useful diisocyanate compounds are those having two free isocyanate groups per molecule, the two groups being different in reactivity from each other, such as 2,4-tolylene diisocyanate, m-xylylene diisocyanate, methylcyclohexane-2,4-diisocyanate, 1,3-diisocyanate methyl cyclohexane, isophorone diisocyanate, etc.

Examples of useful basic catalysts are tertiary amines such as triethylamine dimethyl ethanol, pyridine, tributylamine and the like.

Useful inactive organic solvents are those in which the adduct (a) and the resin (C) can be dissolved or dispersed and which is free of active hydrogen atom reactive with the isocyanate group of the adduct (a). Exemplary of such solvents are aromatic hydrocarbons such as xylene, toluene and the like; ketones such as methyl ethyl ketone, acetone, methyl isobutyl ketone, cyclohexanone and the like; ethers such as ethylene glycol dimethyl ether, diethylene glycol dimethyl ether and the like; esters such as methyl cellosolve acetate, ethyl acetate, methyl acetate and the like; etc.

Useful hydroxyl-containing resins are not limited to specific type and can be any of known ones insofar as the resins have at least 2.0 hydroxyl groups on the average per molecule. Examples of such resins are acrylic polyol, polyester polyol, polyether polyol, alkyd, polycaprolactone polyol, epoxy, urethane polyol and like types.

The $\alpha,\beta$-unsaturated carbonyl group of the resin (B) in the resin composition of the invention consisting essentially of the resin mixture as the component (ii) and the curing catalyst as the component (iii) is represented by the formula. A particular example of such a group is one represented by the formula

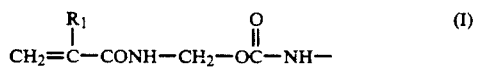

(I)

Examples of the group are acryloyl, methacryloyl, itaconoyl, maleoyl, fumaroyl, crotonoyl, cinnamoyl, acrylamido, methacrylamido, etc. Of the hydroxyl groups in the resin (C) having primary and/or secondary hydroxyl group, a primary one is preferred in view of curability.

The kind of the resin (B) is not critical insofar as the resin has $\alpha,\beta$-unsaturated carbonyl groups. The kind of the resin (C) is not specifically limited if the resin has primary and/or secondary hydroxyl group. The resins (B) and (C) are not limited to specific types and can be any of known ones including acrylic resins, polyester resins, urethane resins, polybutadiene resins, alkyd resins, epoxy resins, phenol resins, polyether resins, polyamide resins and the like. The resins (B) and (C) can be prepared by any of known processes.

The molecular weights of the resins (B) and (C) are not specifically limited. Generally the resins (B) and (C) have a peak molecular weight of preferably about 250 to about 100,000, more preferably about 500 to about 20,000, as determined by gel permeation chromatography, in view of curability and solubility in a solvent. From the viewpoints of curability and water resistance of coat, it is suitable that the resin (B) contain about 0.01 to about 20 moles, preferably about 0.1 to about 5 moles, of the $\alpha,\beta$-unsaturated carbonyl group, per kilogram of the resin and that the resin (C) contain about 0.01 to about 50 moles, preferably about 0.1 to about 10 moles, of the hydroxyl group, per kilogram of the resin.

Preferred examples of the resin (B) are urethane resins which have the residue of adduct of N-methylol acrylamide or methacrylamide with isocyanate which is represented by the formula (I). These resins serve to give a coat particularly excellent in adhesion and resistance to boiling water.

The resin having the functional group of the formula (I) can be easily prepared, for example, by reacting the adduct (a) with the whole hydroxyl group present in the resin having at least 1.0 hydroxyl group on the average per molecule under the same reaction conditions as those described hereinbefore or reacting N-methylol acrylamide or methacrylamide with an isocyanate-containing resin. Examples of useful isocyanate-containing resins are a homopolymer prepared by homopolymerizing an unsaturated monomer such as isocyanate ethyl acrylate or methacrylate, $\alpha,\alpha$-dimethyl-m-isopropenyl-benzyl isocyanate, or a reaction product of 1 mole of hydroxyl-containing acrylate or methacrylate with 1 mole of the diisocyanate compound; a copolymer prepared by copolymerizing the same with other radically polymerizable unsaturated monomer; and a resin prepared by reaction of hydroxyl-containing resin with said diisocyanate compound, etc.

The mixing ratio of the resins (B) and (C) in the resin mixture as the component (ii) according to the invention is preferably about 99.99 to about 50% by weight, more preferably about 99.9 to about 70% by weight, of the resin (B) and preferably about 0.01 to about 50% by weight, more preferably about 0.1 to about 30% by weight, of the resin (C).

The curing catalyst as the component (iii) in the present invention is at least one species selected from the group consisting of alkali metal alkoxides, metal hydroxides, organic acid salts of metals, quaternary ammonium hydroxides, quaternary phosphonium hydroxides, tertiary sulfonium hydroxides and organic acid salts of these onium hydroxides.

Representative metals for metal hydroxides are alkali metals, alkaline earth metals, cobalt, nickel, copper, molybdenum, lead, iron, chromium, manganese, zinc, etc.

Illustrative alkali metal alkoxides are sodium ethoxide, sodium methoxide, potassium methoxide, potassium ethoxide, etc.

Typical alkali metal hydroxides are sodium hydroxide, potassium hydroxide, lithium hydroxide, etc. Representative alkaline earth metal hydroxides are calcium hydroxide, magnesium hydroxide, barium hydroxide, etc.

Useful quaternary ammonium hydroxides, quaternary phosphonium hydroxides and tertiary sulfonium hydroxides include the hydroxides each represented by the formulas (II), (III) and (IV), respectively:

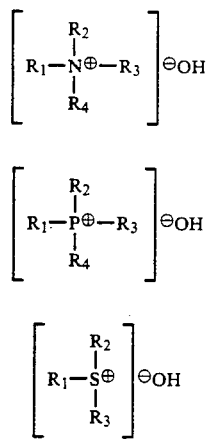

In the formulas, $R_1$, $R_2$, $R_3$ and $R_4$ are the same or different and each represent hydrogen atom or organic group having 1 to 14 carbon atoms, at least one of the $R_1$, $R_2$ and $R_3$ groups is an organic group having 1 to 14 carbon atoms, and the $R_1$ and $R_2$ groups or the $R_1$, $R_2$ and $R_3$ groups when taken together with nitrogen atom, phosphorus atom or sulfur atom to which they are attached may form a heterocyclic group.

The type of organic groups represented by $R_1$, $R_2$, $R_3$ and $R_4$ and having 1 to 14 carbon atoms is not critical insofar as the groups substantially do not hinder ionization of ammonium hydroxides, phosphonium hydroxides or sulfonium hydroxides. Generally usable as such organic groups are hydrocarbon groups of 1 to 14 carbon atoms which may contain hetero-atom such as oxygen atom. Examples of organic groups containing oxygen atom are hydrocarbon groups substituted with hydroxyl or alkoxy group.

Examples of such hydrocarbon groups are aliphatic, alicyclic or aromatic hydrocarbons such as alkyl, cycloalkyl, cycloalkylalkyl, aryl and aralkyl groups. The alkyl groups may be any of straight chain or branched chain ones and include those of 8 or less carbon atoms. Preferable alkyl groups are lower ones and include methyl, ethyl, n- or iso-propyl, n-, iso-, sec- or tert-butyl, pentyl, heptyl and octyl groups. Preferred examples of the cycloalkyl groups or cycloalkylalkyl groups are those having 5 to 8 carbon atoms such as cyclopentyl, cyclohexyl, cyclohexylmethyl, cyclohexylethyl, etc. Useful aryl groups are phenyl, tolyl, xylyl and the like. Benzyl group is suitable as aralkyl group.

Preferred examples of hydrocarbon groups containing hetero-atom such as oxygen atom are hydroxyalkyl (particularly hydroxy-lower alkyl), specific examples being hydroxymethyl, hydroxyethyl, hydroxybutyl, hydroxypentyl, hydroxyheptyl, hydroxyoctyl, alkoxyalkyl (particularly lower alkoxy-lower alkyl) such as methoxymethyl, ethoxymethyl, ethoxyethyl, n-propoxyethyl, iso-propoxymethyl, n-butoxymethyl, iso-butoxyethyl, tert-butoxyethyl, etc.

Given below are examples of heterocyclic groups formed by the $R_1$ and $R_2$ groups or the $R_1$, $R_2$ and $R_3$ groups when taken together with nitrogen atom, phosphorus atom or sulfur atom to which they are attached:

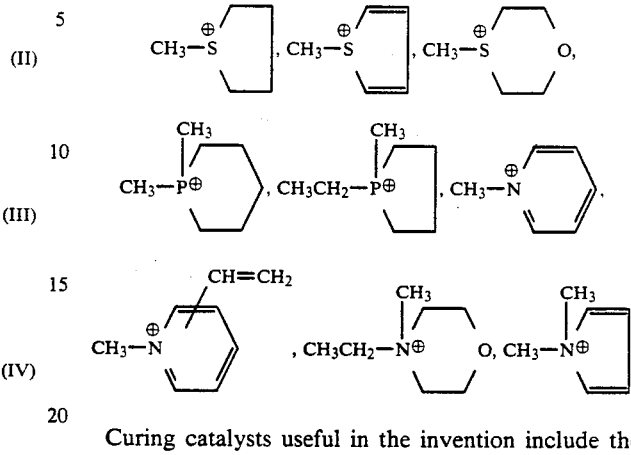

Curing catalysts useful in the invention include the organic acid salts of hydroxides of these alkali metals, alkaline earth metals and other metals and organic acid salts of said onium hydroxides.

Examples of organic acids useful for forming organic acid salts are formic acid, acetic acid, lactic acid, trimethylacetic acid, acrylic acid, methacrylic acid, chloroacetic acid, hydroxyacetic acid, crotonic acid, monomethyl maleate, monoethyl fumarate, monomethyl itaconate, etc. Of these organic acids, those having a dissociation constant (pKa value) of $1 \times 10^{-5}$ or more, particularly acetic acid, formic acid and acrylic acid are preferred.

A suitable amount of the curing catalyst useful as the component (iii) is about 0.001 to about 30 parts by weight per 100 parts of the resin (A) as the component (i) or the mixture of resins (B) and (C) as the component (ii). A smaller amount of curing catalyst used results in unsatisfactory curability, hence undesirable. On the other hand, a larger amount of curing catalyst used is undesirable because the catalyst used tends to remain in the cured coat, reducing the water resistance. A preferable amount of curing catalyst is about 0.01 to about 20 parts by weight.

When required, the curable resin composition of the invention consisting essentially of the resin component as the component (i) or (ii) and the curing catalyst as the component (iii) may contain additives such as a coloring pigment, extender pigment, corrosion-resisting pigment, leveling agent, anti-foaming agent, anti-sagging agent and the like.

The curable resin composition of the invention can be cured on crosslinking by heating at a relatively low temperature. It is suitable that the composition be heated at about 60° to about 300° C., preferably about 100° to about 170° C., for about 5 to about 120 minutes, preferably about 10 to about 30 minutes.

According to the invention, the resin (A) having $\alpha,\beta$-unsaturated carbonyl group and primary and/or secondary hydroxyl group, or alternatively a mixture of the resin (B) having $\alpha,\beta$-unsaturated carbonyl group and the resin (C) having said hydroxyl group is combined with the specific curing catalyst, thereby affording the advantages that the addition reaction of hydroxyl group with unsaturated group is caused at a relatively low temperature and that the addition reaction produces no by-product nor entails any color change of cured coat. The compositions of the invention are also advantageous in being excellent in storage stability and forming a coat excellent in water resistance, surface smoothness and the like when cured and are therefore suitable for use as coating compositions, particularly as paints.

The compositions of the invention prepared using the functional group of the formula (I) as the $\alpha,\beta$-unsaturated carbonyl group can produce coats particularly high in adhesion and resistance to boiling water.

The present invention will be described below in greater detail with reference to the following Preparation Examples, Examples and Comparison Examples wherein the parts and the percentages are all by weight.

PREPARATION OF RESIN (A) HAVING $\alpha,\beta$-UNSATURATED CARBONYL GROUP AND PRIMARY AND/OR SECONDARY HYDROXYL GROUP

Preparation Example 1

| Glycidyl methacrylate | 142 parts |
|---|---|
| 2-Hydroxyethyl acrylate | 116 parts |
| n-butyl methacrylate | 742 parts |
| Azobisisobutyronitrile | 25 parts |

The above mixture was added dropwise to 1000 parts of toluene in a 4-necked flask at 120° C. over a period of 3 hours. Thereafter the mixture was aged at 120° C. for 5 hours.

| Methacrylic acid | 86 parts |
|---|---|
| Hydroquinone | 0.2 part |
| Tetraethyl ammonium bromide | 1.0 part |
| Toluene | 87 parts |

The above mixture was added thereto and the resulting admixture was reacted at 120° C. When an acid value reached 1 or less, the reaction was terminated, giving an acrylic resin solution. The thus obtained resin solution had a nonvolatile content of 50.0% and a viscosity of M (as determined at 25° C. by a Gardner-Holdt bubble viscometer, the same hereinafter). The resin was about 25000 in peak molecular weight as determined by gel permeation chromatography and had an $\alpha,\beta$-unsaturated carbonyl group content of 0.92 mole, a primary hydroxyl group content of 0.92 mole, and a secondary hydroxyl group content of 0.92 mole, all per kilogram of the resin solid.

Preparation Example 2

| "Epikoat #154" (*1) | 627 parts |
|---|---|
| Acrylic acid | 252 parts |
| Hydroquinone | 1 part |
| Tributylamine | 3 parts |
| Ethylene glycol monobutyl ether | 883 parts |

Note: (*1) "Epikoat #154": trademark, product of Yuka Shell Epoxy Co., Ltd., phenol-novolak type epoxy resin, about 500 in number-average molecular weight, about 174 in epoxy equivalent.

The above mixture was charged into a 4-necked flask and reacted at 100° C. When an acid value reached 0, the reaction was terminated, giving an epoxy resin solution. The thus obtained resin solution had a nonvolatile content of 49.7% and a viscosity of H. The resin was about 1000 in peak molecular weight as determined by gel permeation chromatography, and had an $\alpha,\beta$-unsaturated carbonyl group content of 3.98 moles and a secondary hydroxyl group content of 3.98 moles, per kilogram of the resin solid.

Preparation Example 3

| Ethylene glycol | 496 parts |
|---|---|
| Fumaric acid | 1044 parts |
| Trimethylolpropane | 240 parts |

The above mixture was charged into a 4-necked flask and subjected to condensation reaction at 200° C. When an acid value reached 10 or less, the reaction was terminated. Thereafter 1456 parts of butyl acetate was added thereto, giving an polyester resin solution. The thus obtained resin solution had a nonvolatile content of 50.4% and a viscosity of G. The resin was about 5000 in peak molecular weight as determined by gel permeation chromatography, and had an $\alpha,\beta$-unsaturated carbonyl group content of 6.18 moles and a primary hydroxyl group content of 2.34 moles, per kilogram of the resin solid.

Preparation Example 4

| "Placcel #308" (*2) | 1000 parts |
|---|---|
| Isophorone diisocyanate | 444 parts |
| Methyl ethyl ketone | 1444 parts |

Note: (*2) "Placcel #308": trademark, product of Daicel Chemical Industries, Ltd., $\epsilon$-caprolactone type trifunctional polycaprolactone polyol, about 1280 in weight-average molecular weight, 198 in hydroxyl value.

The above mixture was placed into a 4-necked flask, and reacted at 70° C. When an NCO value reached 30, the reaction was terminated.

| 2-Hydroxyethyl acrylate | 232 parts |
|---|---|
| Hydroquinone | 1 part |
| Methyl ethyl ketone | 233 parts |

The above mixture was added thereto and the resulting admixture was reacted at 80° C. When an NCO value reached 1 or less, the reaction was terminated, giving a urethane resin solution. The thus obtained resin solution had a nonvolatile content of 50.0% and a viscosity of X. The resin was about 2000 in peak molecular weight as determined by gel permeation chromatography and had an $\alpha,\beta$-unsaturated carbonyl group content of 1.19 moles and a primary hydroxyl group content of 0.89 mole, per kilogram of the resin solid.

Preparation Example 5

| Isophorone diisocyanate | 444 parts |
|---|---|
| 2-Hydroxyethyl acrylate | 232 parts |
| Methyl ethyl ketone | 290 parts |

The above mixture was charged into a 4-necked flask and reacted at 80° C. until an NCO value reached 87, whereupon an isocyanate-containing unsaturated monomer solution was obtained.

| "Epikoat #1002" (*3) | 1256 parts |
|---|---|
| Diethanolamine | 210 parts |
| Methyl ethyl ketone | 628 parts |

Note: (*3) "Epikoat #1002": trademark, product of Yuka Shell Epoxy Co., Ltd., bisphenol A type epoxy resin, about 1256 in number-average molecular weight, about 630 in epoxy equivalent Aside from the above procedure, the above mixture was charged into a 4-necked flask and reacted at 80° C. curing catalysts as shown below in Table 1 in the amounts listed therein.

TABLE 1

| Component | Example | | | | | | | |
|---|---|---|---|---|---|---|---|---|
| | 1 | 2 | 3 | 4 | 5 | 6 | 7 | 8 |
| Resin (as solids, part) | | | | | | | | |
| Preparation Example 1 | 100 | — | — | — | — | 100 | 100 | 100 |
| Preparation Example 2 | — | 100 | — | — | — | — | — | — |
| Preparation Example 3 | — | — | 100 | — | — | — | — | — |
| Preparation Example 4 | — | — | — | 100 | 100 | — | — | — |
| Curing catalyst (active component, part) | | | | | | | | |
| Potassium hydroxide | 1 | 1 | 1 | 1 | — | — | — | — |
| Potassium formate | — | — | — | — | 2 | — | — | — |
| Sodium ethylate | — | — | — | — | — | 1 | — | — |
| Calcium hydroxide | — | — | — | — | — | — | 3 | — |
| Calcium acetate | — | — | — | — | — | — | — | 4 |

| Component | Example | | | | | | | | |
|---|---|---|---|---|---|---|---|---|---|
| | 9 | 10 | 11 | 12 | 13 | 14 | 15 | 16 | 17 |
| Resin (as solids, part) | | | | | | | | | |
| Preparation Example 2 | 100 | 100 | — | — | — | — | 100 | 100 | — |
| Preparation Example 3 | — | — | 100 | 100 | — | — | — | — | — |
| Preparation Example 4 | — | — | — | — | 100 | 100 | — | — | — |
| Preparation Example 5 | — | — | — | — | — | — | — | — | 100 |
| Curing catalyst (active component, part) | | | | | | | | | |
| Tetramethylammonium hydroxide | 0.1 | — | — | — | — | — | — | — | — |
| Tetramethylammonium acetate | — | 0.2 | — | — | — | — | — | — | — |
| Ethyldimethylsulfonium hydroxide | — | — | 0.05 | — | — | — | — | — | — |
| Ethyldimethylsulfonium acetate | — | — | — | 0.07 | — | — | — | — | — |
| Compound A (*4) | — | — | — | — | 0.01 | — | — | — | — |
| Acetate of Compound A | — | — | — | — | — | 0.02 | — | — | — |
| Compound B (*5) | — | — | — | — | — | — | 10 | — | — |
| Acetate of Compound B | — | — | — | — | — | — | — | 15 | — |
| Cobalt acetate | — | — | — | — | — | — | — | — | 1 |

Note:
(*4) Compound A is a compound represented by

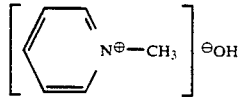

(*5) Compound B is a compound represented by

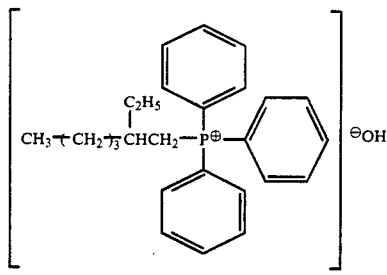

over a period of 3 hours, giving a hydroxyl-containing resin solution.

The monomer solution (966 parts) and 2094 parts of the hydroxyl-containing resin solution were mixed and reacted at 80° C. for 10 hours, giving an epoxy urethane resin solution. The obtained resin solution had a nonvolatile content of 70.0% and a viscosity of X. The resin was about 2300 in peak molecular weight as determined by gel permeation chromatography, and had an $\alpha,\beta$-unsaturated carbonyl group content of 0.93 mole and a primary hydroxyl group content of 0.93 mole, per kilogram of the resin solid.

Examples 1 to 17

The curable resin compositions of the present invention were prepared by homogeneously mixing the resin solutions obtained in Preparation Examples and the Each of the compositions prepared in Examples 1 to 17 was applied to a glass plate to form a layer having a thickness of about 20 μm when dried. The layer deposited on the glass plate was cured by baking in an oven. The coated glass plate was checked for the water resistance and gel fraction ratio. The compositions were also tested for the storage stability. The baking was performed under the following conditions and the tests were conducted by the methods described below.

Baking conditions

The coated glass plate was baked at 140° C. for 30 minutes in Examples 1 to 5 and 17, and at 100° C. for 10 minutes in Example 6, at 120° C. for 10 minutes in Examples 7 and 8 and at 140° C. for 10 minutes in Examples 9 to 16.

Water resistance

The appearance of the coated glass plate was checked after 7 days of immersion in warm water at 40° C.

Gel fraction ratio

The layer formed and cured on the glass plate was peeled and placed into a container of 300-mesh stainless steel netting whereupon the layer was extracted with a Soxhlet's extractor for 6 hours using a solvent mixture of acetone and methanol in equal amounts in terms of weight. The gel fraction ratio was calculated according to the following equation:

Gel fraction ratio (%) = (weight of layer after extraction/weight of layer before extraction) × 100

Storage stability

Into a hermetically closed can 250 cc in internal volume was charged 200 g of each of the compositions obtained in Examples and Comparison Examples. The composition was checked for properties after 30 days of storage at 50° C. The composition involving neither significant increase of viscosity nor gelation was expressed with a mark "A".

Resistance to discoloration

The layer formed and cured on the glass plate was visually inspected for the degree of color change. The layer which had no color change was expressed as A, and the layer which turned yellow as B. Table 2 below shows the test results.

TABLE 2

| Properties | Example | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Water resistance | NC* | NC | NC | NC | NC | NC | NC | NC | NC | NC | NC | NC | NC | NC | NC | NC | NC |
| Gel fraction ratio | 98.2 | 96.6 | 90.4 | 95.8 | 95.6 | 98.8 | 96.2 | 96.0 | 95.8 | 95.6 | 90.9 | 90.7 | 95.0 | 94.8 | 93.8 | 93.5 | 90.3 |
| Storage stability | A | A | A | A | A | A | A | A | A | A | A | A | A | A | A | A | A |
| Resistance to discoloration | A | A | A | A | A | A | A | A | A | A | A | A | A | A | A | A | A |

(*NC = No change)

Resistance to boiling water

Each of the compositions was checked for the resistance to boiling water by the following method.

The composition was applied to a steel plate treated with zinc phosphate to form a layer having a 20 μm thickness when dried. The coated plate was baked and then immersed in boiling water for 1 hour or 2 hours and withdrawn to evaluate the appearance of layer and the adhesion.

(i) Appearance of coating layer

The coating layer was checked for cracking, peeling and blistering.

(ii) Adhesion

A coated plate was cut crosswise to the substrate to produce 100 squares having 1-mm sides, and cellophane adhesive tape was adhered and peeled off after uniformly pressing the tape-covered surface with an even force. Then the number of squares remaining adhered was counted.

Table 3 below shows the results.

TABLE 3

| | Example | | | | | | | | |
|---|---|---|---|---|---|---|---|---|---|
| | 1 | 2 | 3 | 4 | 5 | 6 | 7 | 8 | 9 |
| Resistance to boiling water 1 hour of immersion | | | | | | | | | |
| Adhesion | 100 | 100 | 100 | 100 | 100 | 100 | 100 | 100 | 100 |
| Appearance | Good | Good | Good | Good | Good | Good | Good | Good | Good |
| 2 hours of immersion | | | | | | | | | |
| Adhesion | 60 | 60 | 60 | 60 | 60 | 60 | 80 | 80 | 60 |
| Appearance | *SB | SB | SB | SB | SB | SB | Good | Good | SB |
| Baking conditions | | | | | | | | | |
| Temperature (°C.) | 170 | 170 | 170 | 170 | 170 | 170 | 170 | 170 | 170 |
| Time (min) | 30 | 30 | 30 | 30 | 30 | 30 | 30 | 30 | 30 |

| | Example | | | | | | | |
|---|---|---|---|---|---|---|---|---|
| | 10 | 11 | 12 | 13 | 14 | 15 | 16 | 17 |
| Resistance to boiling water 1 hour of immersion | | | | | | | | |
| Adhesion | 100 | 100 | 100 | 100 | 100 | 100 | 100 | 100 |
| Appearance | Good | Good | Good | Good | Good | Good | Good | Good |
| 2 hours of immersion | | | | | | | | |
| Adhesion | 60 | 80 | 80 | 80 | 80 | 80 | 80 | 20 |
| Appearance | *SB | Good | Good | Good | Good | Good | Good | Blistering |
| Baking conditions | | | | | | | | |
| Temperature (°C.) | 170 | 170 | 170 | 170 | 170 | 170 | 170 | 160 |
| Time (min) | 30 | 30 | 30 | 30 | 30 | 30 | 30 | 30 |

(*SB = Slight blistering)

PREPARATION OF RESIN (B) HAVING α,β-UNSATURATED CARBONYL GROUP

Preparation Example 6

| Glycidyl methacrylate | 142 parts |
|---|---|
| n-Butyl methacrylate | 858 parts |

-continued

| | |
|---|---|
| Azobisisobutyronitrile | 25 parts |

The above mixture was added dropwise to 1000 parts of toluene in a 4-necked flask at 120° C. over a 3 hours' period. The resulting mixture was aged at 120° C. for 5 hours.

| | |
|---|---|
| Methacrylic acid | 86 parts |
| Hydroquinone | 0.2 part |
| Tetraethyl ammonium bromide | 1.0 part |
| Toluene | 87 parts |

The above mixture was added thereto and the resulting admixture was reacted at 120° C. When an acid value reached 1 or less, the reaction was terminated, giving an acrylic resin solution. The resin solution had a nonvolatile content of 50.0% and a viscosity of H. The resin was about 25000 in peak molecular weight as determined by gel permeation chromatography and had an $\alpha,\beta$-unsaturated carbonyl group content of 0.92 mole and a secondary hydroxyl group content of 0.92 mole, per kilogram of the resin solid.

Preparation Example 7

| | |
|---|---|
| "Epikoat #154" | 627 parts |
| Acrylic acid | 252 parts |
| Hydroquinone | 1 part |
| Tributylamine | 3 parts |
| Ethylene glycol monobutyl ether | 883 parts |

The above mixture was introduced into a 4-necked flask and reacted at 100° C. When an acid value reached 0, the reaction was terminated, giving an epoxy resin solution. The resin solution had a nonvolatile content of 49.7% and a viscosity of H. The resin was about 1000 in peak molecular weight as determined by gel permeation chromatography and had an $\alpha,\beta$-unsaturated carbonyl group content of 3.96 moles and a secondary hydroxy group content of 3.96 moles, per kilogram of the resin solid.

Preparation Example 8

| | |
|---|---|
| Ethylene glycol | 496 parts |
| Fumaric acid | 1044 parts |

The above mixture was placed into a 4-necked flask and subjected to condensation reaction at 200° C. On completion of dehydration, the reaction was terminated. Thereafter 1252 parts of butyl acetate was added to the reaction mixture, giving a polyester resin solution. The resin solution had a nonvolatile content of 50.2% and a viscosity of Q. The resin was about 3500 in peak molecular weight as determined by gel permeation chromatography and had an $\alpha,\beta$-unsaturated carbonyl group content of 7.19 moles per kilogram of the resin solid but no hydroxyl group.

Preparation Example 9

| | |
|---|---|
| "Placcel #308" | 1000 parts |
| Isophorone diisocyanate | 666 parts |
| Methyl ethyl ketone | 1666 parts |

The above mixture was placed into a 4-necked flask and reacted at 70° C. The reaction was terminated when an NCO value reached 38.

| | |
|---|---|
| 2-Hydroxyethyl acrylate | 348 parts |
| Hydroquinone | 1.5 parts |
| Methyl ethyl ketone | 350 parts |

The above mixture was added thereto and the resulting admixture was reacted at 80° C. When an NCO value reached 1 or less, the reaction was terminated, giving a urethane resin solution. The resin solution had a nonvolatile content of 49.8% and a viscosity of Z. The resin was about 2000 in peak molecular weight as determined by gel permeation chromatography and had an $\alpha,\beta$-unsaturated carbonyl group content of 1.49 moles per kilogram of the resin solid but no hydroxyl group.

PREPARATION OF RESIN (C) HAVING PRIMARY AND/OR SECONDARY HYDROXYL GROUP

Preparation Example 10

| | |
|---|---|
| 2-Hydroxyethyl acrylate | 116 parts |
| n-Butyl methacrylate | 884 parts |
| Azobisisobutyronitrile | 25 parts |

The above mixture was added dropwise to 1000 parts of toluene in a 4-necked flask at 120° C. over a 3 hours' period. The mixture was aged at 120° C. for 5 hours, giving an acrylic resin solution. The resin solution had a nonvolatile content of 50.0% and a viscosity of O. The resin was about 30000 in peak molecular weight as determined by gel permeation chromatography and had a primary hydroxyl group content of 1.00 mole per kilogram of the resin solid but no $\alpha,\beta$-unsaturated carbonyl group.

Preparation Example 11

| | |
|---|---|
| "Epikoat #154" | 627 parts |
| Diethanolamien | 245 parts |
| Ethylene glycol monobutyl ether | 872 parts |

The above mixture was introduced into a 4-necked flask and reacted at 100° C. for 1 hour, giving an epoxy resin solution.

The resin solution had a nonvolatile content of 49.7% and a viscosity of V. The resin was about 1000 in peak molecular weight as determined by gel permeation chromatography. The resin had a primary hydroxyl group content of 5.45 moles and a secondary hydroxyl group content of 2.73 moles, per kilogram of the resin solid but no $\alpha,\beta$-unsaturated carbonyl group.

Preparation Example 12

| | |
|---|---|
| Ethylene glycol | 496 parts |
| Phthalic acid | 1332 parts |
| Trimethylolpropane | 240 parts |

The above mixture was charged into a 4-necked flask and subjected to condensation reaction at 200° C. When an acid value reached 10 or less, the reaction was terminated. Thereto added was 1906 parts of butyl acetate, giving a polyester resin solution. The resin solution had a nonvolatile content of 50.5% and a viscosity of M. The resin was about 5000 in peak molecular weight as determined by gel permeation chromatography. The resin contained no $\alpha,\beta$-unsaturated carbonyl group but had a primary hydroxyl group content of 1.78 moles per kilogram of the resin solid.

Examples 18 to 30 and Comparison Examples 1 to 3

The curable resin compositions of the present invention and comparative curable resin compositions were prepared by homogeneously mixing the resin solutions obtained in Preparation Examples and the curing catalysts shown below in Table 4 in the amounts listed therein.

glass plate to form a layer having a thickness of about 20 μm when dried. The layer deposited on the glass plate was cured by baking in an oven. The cured coated plate was checked for the water resistance and gel fraction ratio. The compositions were also tested for the storage stability. The coated glass plates were baked at 140° C. for 30 minutes in Examples 18, 19 and 27 to 30 and Comparison Examples 1 to 3, at 140° C. for 10 minutes in Examples 20 to 22, at 120° C. for 30 minutes in Examples 23 and 24 and at 100° C. for 10 minutes in Examples 25 and 26.

Table 5 below shows the results.

Each of the compositions was checked for the resistance to boiling water by the same method as the fore-

TABLE 4

| Component | Example | | | | | | | |
|---|---|---|---|---|---|---|---|---|
| | 18 | 19 | 20 | 21 | 22 | 23 | 24 | 25 |
| Resin (B) | | | | | | | | |
| Preparation Example No. | 6 | 6 | 9 | 9 | 9 | 7 | 7 | 8 |
| Solids content of resin (part) | 50 | 50 | 95 | 95 | 95 | 80 | 80 | 30 |
| Resin (C) | | | | | | | | |
| Preparation Example No. | 10 | 10 | 11 | 11 | 11 | 11 | 11 | 12 |
| Solids content of resin (part) | 50 | 50 | 5 | 5 | 5 | 20 | 20 | 70 |
| Curing catalyst (active component, part) | | | | | | | | |
| Potassium hydroxide | 1 | — | — | — | — | — | — | — |
| Potassium formate | — | 2 | — | — | — | — | — | — |
| Sodium ethylate | — | — | 1 | — | — | — | — | — |
| Calcium hydroxide | — | — | — | 2 | — | — | — | — |
| Calcium acetate | — | — | — | — | 5 | — | — | — |
| Tetramethylammonium hydroxide | — | — | — | — | — | 0.1 | — | — |
| Tetramethylammonium acetate | — | — | — | — | — | — | 0.2 | — |
| Ethyldimethylsulfonium hydroxide | — | — | — | — | — | — | — | 3 |

| | Example | | | | | Comparison Example | | |
|---|---|---|---|---|---|---|---|---|
| | 26 | 27 | 28 | 29 | 30 | 1 | 2 | 3 |
| Resin (B) | | | | | | | | |
| Preparation Example No. | 8 | 9 | 9 | 6 | 6 | 9 | 6 | 9 |
| Solids content of resin (part) | 30 | 90 | 90 | 50 | 50 | 100 | 50 | 80 |
| Resin (C) | | | | | | | | |
| Preparation Example No. | 12 | — | — | 10 | 10 | — | 10 | — |
| Solids content of resin (part) | 70 | — | — | 50 | 50 | — | 50 | — |
| "Placcel #308" (part) | — | 10 | 10 | — | — | — | — | — |
| Hexamethylenediamine (part) | — | — | — | — | — | — | — | 20 |
| Curing catalyst (active component, part) | | | | | | | | |
| Potassium hydroxide | — | — | — | — | — | 1 | — | — |
| Ethyldimethylsulfonium acetate | 5 | — | — | — | — | — | — | — |
| Compound A (*4) | — | 0.01 | — | — | — | — | — | — |
| Acetate of Compound A | — | — | 0.02 | — | — | — | — | — |
| Compound B (*5) | — | — | — | 10 | — | — | — | — |
| Acetate of Compound B | — | — | — | — | 15 | — | — | — |

Each of the compositions prepared in Examples 18 to 30 and Comparison Examples 1 to 3 was applied to a going one.

Table 6 below shows the results.

TABLE 5

| Properties | Example | | | | | | | | | | | | | Comparison Example | | |
|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 1 | 2 | 3 |
| Water resistance | NC* | NC | NC | NC | NC | NC | NC | NC | NC | NC | NC | NC | NC | Blushing | Dissolved | Blistering |
| Gel fraction ratio | 94.8 | 94.5 | 92.8 | 92.9 | 92.6 | 95.5 | 95.4 | 94.6 | 94.4 | 90.9 | 90.9 | 91.5 | 91.3 | 75.2 | 0 | 98.7 |
| Storage stability | A | A | A | A | A | A | A | A | A | A | A | A | A | A | A | Gelled in 2 days |
| Resistance to discoloration | A | A | A | A | A | A | A | A | A | A | A | A | A | A | A | B |

(*NC = No change)

TABLE 6

| | Example | | | | | | | | |
|---|---|---|---|---|---|---|---|---|---|
| | 18 | 19 | 20 | 21 | 22 | 23 | 24 | 25 | 26 |
| Resistance to boiling water | | | | | | | | | |

TABLE 6-continued

| 1 hour of immersion | | | | | | | | | |
|---|---|---|---|---|---|---|---|---|---|
| Adhesion | 100 | 100 | 100 | 100 | 100 | 100 | 100 | 100 | 100 |
| Appearance | Good | Good | Good | Good | Good | Good | Good | Good | Good |
| 2 hours of immersion | | | | | | | | | |
| Adhesion | 60 | 60 | 60 | 80 | 80 | 60 | 60 | 80 | 80 |
| Appearance | *SB | SB | SB | Good | Good | SB | SB | Good | Good |
| Baking conditions | | | | | | | | | |
| Temperature (°C.) | 170 | 170 | 170 | 170 | 170 | 170 | 170 | 170 | 170 |
| Time (min) | 30 | 30 | 30 | 30 | 30 | 30 | 30 | 30 | 30 |

| | | Example | | | | Comparison Example | | |
|---|---|---|---|---|---|---|---|---|
| | | 27 | 28 | 29 | 30 | 1 | 2 | 3 |
| Resistance to boiling water | | | | | | | | |
| 1 hour of immersion | | | | | | | | |
| Adhesion | | 100 | 100 | 100 | 100 | Peeling of coat | Dissolution of coat | Peeling of coat |
| Appearance | | Good | Good | Good | Good | | | |
| 2 hours of immersion | | | | | | | | |
| Adhesion | | 80 | 80 | 80 | 80 | — | — | — |
| Appearance | | Good | Good | Good | Good | — | — | — |
| Baking conditions | | | | | | | | |
| Temperature (°C.) | | 170 | 170 | 170 | 170 | 170 | 170 | 170 |
| Time (min) | | 30 | 30 | 30 | 30 | 30 | 30 | 30 |

(*SB = Slight blistering)

EXAMPLES ILLUSTRATIVE OF CURABLE RESIN COMPOSITIONS CONTAINING α,β-UNSATURATED CARBONYL GROUP AS THE FUNCTIONAL GROUP OF THE FORMULA (I)

Example 31

| "Epikoat #1002" | 1256 parts |
|---|---|
| Diethanolamine | 210 parts |
| Methyl ethyl ketone | 628 parts |

The above mixture was charged into a 4-necked flask and reacted at 80° C. for 3 hours, giving a hydroxyl-containing resin solution.

| Isophorone diisocyanate | 444 parts |
|---|---|
| N-methylol acrylamide | 202 parts |
| Methyl ethyl ketone | 277 parts |

Aside from the above procedure, the above mixture was placed into a 4-necked flask and reacted at 80° C. until an NCO value of 91 was reached, whereupon an isocyanate-containing unsaturated monomer solution was obtained.

The hydroxyl-containing resin solution (2094 parts) was mixed with 923 parts of the isocyanate-containing unsaturated monomer. The mixture was subjected to reaction at 80° C. for 10 hours, giving an epoxy urethane resin solution. The resin solution had a solids content of 70% and a viscosity of $Z_5$. The resin was about 2200 in peak molecular weight as determined by gel permeation chromatography and had an α,β-unsaturated carbonyl group content of 0.95 mole and a primary hydroxyl group content of 0.95 mole, per kilogram of the resin solid. One part of cobalt acetate was added to 100 parts of the resin solution (as solids), followed by mixing them, whereupon the curable resin composition of the invention was obtained.

Example 32

The curable resin composition of the present invention was produced by carrying out the same procedure as done in Example 31 with the exception of using the same amount of calcium acetate in place of cobalt acetate.

Example 33

The curable resin composition of the present invention was produced by carrying out the same procedure as done in Example 31 with the exception of using 0.5 part of trimethylsulfonium acetate in place of cobalt acetate.

Example 34

The curable resin composition of the present invention was produced by carrying out the same procedure as done in Example 31 with the exception of using 0.2 part of sodium formate in place of cobalt acetate.

Example 35

| α,α-Dimethyl-m-isopropenyl benzyl isocyanate | 210 parts |
|---|---|
| n-Butyl acrylate | 649 parts |
| Styrene | 150 parts |
| Azobisisobutyronitrile | 20 parts |

One thousand parts of toluene was charged into a 4-necked flask and heated with stirring to 120° C. and the above mixture was added dropwise over a 3 hours' period. The resulting admixture was aged at the same temperature for 2 hours, giving an isocyanate-containing acrylic resin solution having a solids content of 50% and a viscosity of P.

| N-methylol acrylamide | 101 parts |
|---|---|
| Methyl ethyl ketone | 101 parts |
| Hydroquinone | 0.1 part |

The above mixture was added dropwise to 1029 parts of the resin solution and the resulting admixture was reacted for 5 hours until an NCO value of 1 or less was achieved, whereby an acryl urethane resin solution was obtained. The resin solution had a solids content of 50% and a viscosity of Z. The resin was about 26000 in peak molecular weight as determined by gel permeation chromatography and had an α,β-unsaturated carbonyl group content of 0.90 mole per kilogram of the resin solid.

| 2-Hydroxyethyl acrylate | 232 parts |
| --- | --- |
| n-Butyl methacrylate | 768 parts |
| Azobisisobutyronitrile | 20 parts |

Aside from the above procedure, 1000 parts of toluene was placed into a 4-necked flask and heated with stirring to 120° C. The above mixture was added dropwise over a 3 hours' period, and the resulting admixture was aged at the same temperature for 2 hours, giving an acrylic resin solution. The resin solution had a solids content of 50% and a viscosity of H. The resin was about 2400 in peak molecular weight as determined by gel permeation chromatography and had a primary hydroxyl group content of 2.00 moles per kilogram of the resin solid.

Tetramethylammonium hydroxide (0.5 part) was mixed with 100 parts of a mixture of 50 parts of the acryl urethane resin solution (as solids) and 50 parts of the acrylic resin solution (as solids), whereby the curable resin composition of the invention was obtained.

Example 36

The curable resin composition of the invention was prepared in the same manner as done in Example 35 with the exception of using a different amount, i.e. 1.0 part, of tetramethylammonium hydroxide.

Example 37

The curable resin composition of the invention was prepared in the same manner as done in Example 35 with the exception of using 1.0 part of cobalt acetate in place of tetramethylammonium hydroxide.

Example 38

The curable resin composition of the invention was prepared in the same manner as done in Example 35 with the exception of using 0.5 part of sodium formate in place of tetramethylammonium hydroxide.

Each of the compositions obtained in Examples 31 to 38 was applied to a glass plate to form a layer having a thickness of about 20 μm when dried. The layer deposited on the glass plate was cured by baking in a dryer. The coated plate was checked for the water resistance and the gel fraction ratio. Also the compositions were tested for the storage stability. The baking was conducted by the same method as described hereinbefore, at 140° C. for 30 minutes in Examples 31 to 33, 35 and 37 and at 130° C. for 30 minutes in Examples 34, 36 and 38. Table 7 below shows the results.

Each of the compositions was checked for the resistance to boiling water by the same method as the foregoing one with the results shown below in Table 8.

TABLE 7

| Properties | Example | | | | | | | |
| --- | --- | --- | --- | --- | --- | --- | --- | --- |
| | 31 | 32 | 33 | 34 | 35 | 36 | 37 | 38 |
| Water resistance | NC* | NC | NC | NC | NC | NC | NC | NC |
| Gel fraction ratio | 95.5 | 92.8 | 94.2 | 98.8 | 94.0 | 94.5 | 93.3 | 97.9 |
| Storage stability | A | A | A | A | A | A | A | A |
| Resistance to discoloration | A | A | A | A | A | A | A | A |

(*NC = No change)

TABLE 8

| | Example | | | | | | | |
| --- | --- | --- | --- | --- | --- | --- | --- | --- |
| | 31 | 32 | 33 | 34 | 35 | 36 | 37 | 38 |
| Resistance to boiling water | | | | | | | | |
| 1 hour of immersion | | | | | | | | |
| Adhesion | 100 | 100 | 100 | 100 | 100 | 100 | 100 | 100 |
| Appearance | Good | Good | Good | Good | Good | Good | Good | Good |
| 2 hours of immersion | | | | | | | | |
| Adhesion | 100 | 100 | 100 | 100 | 100 | 100 | 100 | 100 |
| Appearance | Good | Good | Good | Good | Good | Good | Good | Good |
| Baking conditions | | | | | | | | |
| Temperature (°C.) | 160 | 170 | 160 | 130 | 160 | 130 | 160 | 130 |
| Time (min) | 30 | 20 | 30 | 30 | 30 | 30 | 30 | 30 |

We claim:

1. A curable resin composition consisting essentially of:

(i) a resin (A) containing primary and/or secondary hydroxyl groups and α,β-unsaturated carbonyl groups of the formula

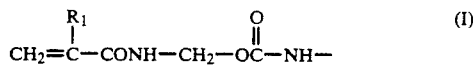

$$CH_2=C(R_1)-CONH-CH_2-OC(=O)-NH- \quad (I)$$

wherein $R_1$ is hydrogen atom or methyl group; or (ii) a mixture of a resin (B) containing the residues being represented by the above formula (I) and a resin (C) containing primary and/or secondary hydroxyl groups, and free of α,β-unsaturated carbonyl group; and (iii) at least one curing catalyst selected from the group consisting of alkali metal alkoxides, metal hydroxides, organic acid salts of metals, quaternary ammonium hydroxides, quaternary phosphonium hydroxides, tertiary sulfonium hydroxides and organic acid salts of these onium hydroxides.

2. A composition according to claim 1, wherein the resin (A) is a resin having about 0.01 to about 20 moles of the α,β-unsaturated carbonyl group and about 0.01 to about 50 moles of the hydroxyl group, per kilogram of the resin.

3. A composition according to claim 1, wherein the resin (B) has about 0.01 to about 20 moles of the α,β-unsaturated carbonyl group, per kilogram of the resin, and the resin (C) has about 0.01 to about 50 moles of the hydroxyl group, per kilogram of the resin.

4. A composition according to claim 1, wherein the resin mixture as the component (ii) consists of about 99.99 to about 50% by weight of the resin (B) and about 0.01 to about 50% by weight of the resin (C).

5. A composition according to claim 1, wherein the amount of the curing catalyst as the component (iii) is about 0.001 to about 30 parts by weight per 100 parts by weight of the resin (A) as the component (i) or the mixture of the resin (B) and the resin (C) as the component (ii).

* * * * *